United States Patent [19]

Rossi et al.

[11] Patent Number: 4,861,469
[45] Date of Patent: Aug. 29, 1989

[54] FUEL TANK DEWATERING APPARATUS

[75] Inventors: James L. Rossi, San Jose; Franklin B. Lawrence, Los Gatos, both of Calif.

[73] Assignee: American Transportation Technology, Inc., Los Gatos, Calif.

[21] Appl. No.: 187,498

[22] Filed: Apr. 28, 1988

[51] Int. Cl.$^4$ ............................................. B01J 20/22
[52] U.S. Cl. ............................................. 210/172; 210/282; 210/502.1; 210/DIG. 6
[58] Field of Search ............... 210/94, 172, 282, 485, 210/502.1, 689, DIG. 6; 585/830; 502/400, 401, 402

[56] References Cited

U.S. PATENT DOCUMENTS

| | | | |
|---|---|---|---|
| 3,122,501 | 2/1964 | Hultgren | 210/94 |
| 3,951,812 | 4/1976 | Hsu | 210/502.1 |
| 4,061,807 | 12/1977 | Shaler et al. | 210/502.1 |
| 4,419,236 | 12/1983 | Hsu | 210/689 |
| 4,588,505 | 5/1986 | Walley et al. | 210/502.1 |
| 4,758,350 | 7/1988 | Pitts et al. | 210/689 |
| 4,775,473 | 10/1988 | Johnson et al. | 210/502.1 |

FOREIGN PATENT DOCUMENTS 670250   4/1952   United Kingdom ............... 210/689

Primary Examiner—W. Gary Jones
Assistant Examiner—Matthew O. Savage
Attorney, Agent, or Firm—Allan R. Fowler

[57] ABSTRACT

Described is a dewatering apparatus for insertion into and retrieval from an engine fuel tank through the tank inlet for removing water from the liquid fuel contained in the tank. The apparatus includes an elongate cylindrical container of fixed capacity and an elongate tie connected thereto and accessibly anchored near the fuel tank inlet. A volume of dry particulate hygroscopic material, principally cross-linked polyacrylamide copolymer fills a minor portion of the container capacity, and is expandable to many times its dry volume in the presence of water without absorbing the liquid fuel, so as to remove water therefrom within the capacity of the container. The dry volume is selected to limit the fully expanded volume to within the capacity of the container. The container is made of nylon or Delrin plastic and includes a rigid structural cage having spaced longitudinal and circumferential ribs, joined together with end closures and with a cylindrical screen contained within the cage for providing substantial porous wall surfaces exposed therebetween which are permeable to air, water and the liquid fuel but substantially impermeable to the hygroscopic material.

6 Claims, 1 Drawing Sheet

FUEL TANK DEWATERING APPARATUS

BACKGROUND OF THE INVENTION

This invention relates to apparatus for use in conjunction with an engine fuel tank having an inlet therein for filling the tank with liquid fuel, for example, diesel fuel or gasoline, and has particular reference to apparatus adapted for manual insertion into and removal from the fuel tank through said inlet for removing water from the liquid fuel contained in the fuel tank.

Liquid fuel often contains undesirable contaminants, especially water. The water may have gotten into the fuel by various means anywhere in the chain of manufacture and distribution of the fuel. One source for such water is condensation from moist air which has entered a bulk fuel storage tank from which the liquid fuel water mixture is later pumped into an engine fuel tank such as at a filling station. Such condensation from moist air inside engine fuel tanks themselves can also prove a significant source of water contamination, especially inside fuel tanks which are not sealed but are vented to the atmosphere.

As is well known, the inclusion of water in liquid fuel systems for engines is undesirable for many reasons including the formation of various corrosive acids conducive to engine wear and fuel injection corrosion, potential freezing of fuel lines, lower engine efficiency, combustion failure, etc., and the cost and maintenance problems associated therewith. In diesel engine fuel systems problems of water in the deisel fuel are particularly acute because the water/diesel fuel mixture readily supports the growth of colonies of bacteria which look and act like slimes and either reduce the efficiency and increase the maintenance problems of the engine and its fuel system components, or actually disrupt the flow of fuel by clogging the fuel system components such as the fuel lines, filters and fuel injectors.

The significance of the water contamination problem has long been recognized for the individual operator of various engine-powered equipment such as trucks, boats, farm equipment, earth moving equipment, automobiles or engines. However, so far as is known, there has been no simple and practical apparatus for conveniently detecting water in and removing water from the fuel in the engine fuel tank prior to its entry into the fuel system proper. Instead, individual operators are encouraged to use various expensive additives such as surfactants, dispersants and bacteriacides to be poured into the engine fuel tank each time it is filled. Such additives may be helpful in partially palliating some of the problems resulting from water contamination, provided such additives are available and remembered at the time the tank is filled, and provided the minimum proper additive dosage, which varies with the unknown condition of the fuel at hand is employed. Of course, the engine and fuel system now has to deal with the additives as well as with the original water contaminant, if any.

Accordingly, there exists a need for a practical and conveniently usable apparatus for detecting water in and cost effectively removing water, in whole or in part, from the liquid fuel while the fuel is still in the engine fuel tanks, prior to its entry into the balance of the fuel system or into the engine proper. It is also desirable to know by simple inspection approximately when and at least to some extent the degree that water has contaminated the fuel tank, so that the source of the contamination may more readily be deduced, and corrective measures taken. It is an object of the present invention to provide simple, inexpensive and conveniently usable apparatus for these purposes.

SUMMARY OF THE INVENTION

In accordance with our invention, and for use in conjunction with an engine fuel tank having an inlet therein for filling the tank with liquid fuel, we provide a elongate substantially hollow and cylindrical submersible container adapted for manual insertion into the fuel tank through the inlet, together with an elongate tether or tie means for manually retrieving the container from the fuel tank through the inlet. The container comprises a substantially rigid structural cage which encompasses an elongate cylindrical volume, and a correspondingly approximately cylindrical screen immediately encompassed by and contained within the cage. In the preferred embodiment of our invention, the cage has a plurality of circumferentially spaced longitudinal ribs, a plurality of longitudinally spaced circumferential ribs, and opposite end closures, such ribs and end closures being joined together. The cylindrical screen provides porous wall portions of substantial extent exposed between the spaced apart ribs along the length and around the girth of the container, and in conjunction with the cage, defines a substantially open and fixed, approximately cylindrical internal volume. The elongate tie means has proximate and distal end portions. Means are provided for attaching the distal end portion of the tie means to the structural coze of the container. Means are also provided for releasably anchoring the proximate end portion of the tie means at an accessible position near the fuel tank inlet. A volume of dry particulate hygroscopic material is disposed inside the container and fills a minor portion of the cylindrical internal volume capacity of the container. The hygroscopic material is expandable to many times its dry volume in the presence of water. The screen has exposed porous wall portions which are permeable to air and water and to the liquid fuel, but substantially impermeable under normal conditions to the dry or expanded hygroscopic material. The dry volume of the hygroscopic material placed in the container is selected to limit its fully expanded volume in the presence of water to a predetermined hydrated volume which at least substantially fills the capacity of the container, without rupturing the container, or extruding the hygroscopic material through the exposed porous wall portions of the screen.

The hygroscopic material chosen should be one which does not significantly absorb the liquid fuel or alter the chemical or physical properties of the fuel. We prefer to use a material composed principally of cross-linked polyacrylamide co-polymer, which is available as a fine white granular powder sold under the mark "ALCOSORB AB3C" in particle size of 500 microns and greater, available from Allied Colloids, 2301 Wilroy Road, Suffolk, Va. 23434. This material in the presence of water may expand its volume by as much as 70 times or more, and under normal conditions is substantially non-reactive with and non-absorbant of diesel fuel and gasoline.

The container and in major part the tie means are preferably made of a suitable plastic material such as Nylon which chemically is substantially non-reactive with water, gasoline or diesel fuel under normal conditions and which is of a higher specific gravity than these liquids, whereby with the tie means being of adequate length the container with contents sinks in the liquid fuel to the bottom of the fuel tank where, because of its specific gravity, the presence of water is most likely.

In the preferred embodiment of our invention, the longitudinal and circumferential ribs of the rigid structural cage are fused with the cylindrical screen providing the porous wall surfaces of the container, the screen thus being contained and secured within the cage and end closures. The screen means is 390 micron mesh, hence readily contains the particulate hygroscopic material which, when dry, is essentially composed of particle sizes substantially in excess of 390 microns, while at the same time readily passes air, water and liquid fuel.

While we prefer a container having a fixed elongate cylindrical volume for the hygroscopic material to facilitate the entry and retrieval thereof through the usual relative narrow inlet of the conventional engine fuel tank.

In use, the container with the dry hygroscopic material contained therein is inserted into the fuel tank and is periodically inspected by retrieving it with the tie. By viewing through a wall portion of the container, the expansion of the hygroscopic material may be visually detected, thus indicating the presence of water in the liquid fuel, with the degree of expansion indicating to some degree the seriousness of the water contamination. If the hygroscopic material is not fully expanded to substantially fill the container, the container may be reinserted into the fuel tank to take on more water, or if fully expanded, the container may be discarded and replaced with a fresh container to remove more water.

The foregoing and other features and advantages of our invention will be more clearly understood by reference to the following detailed specification of the preferred embodiment of our invention, taken in conjunction with the accompanying drawings, in which:

DESCRIPTION OF THE PREFERRED EMBODIMENT

Figure 1:
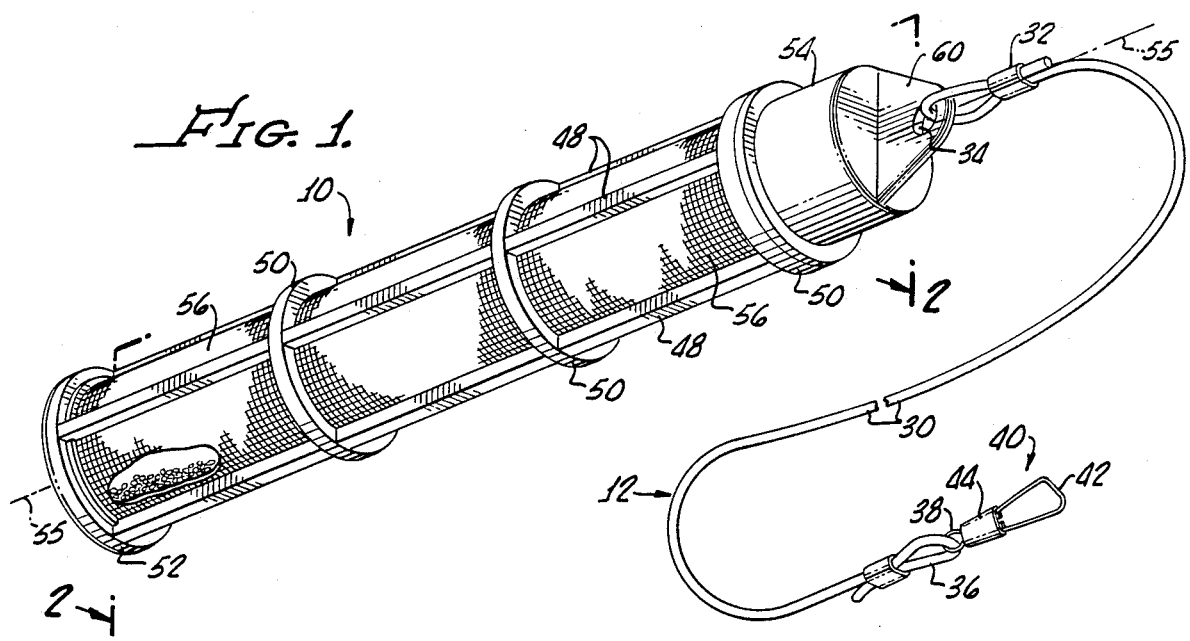
FIG. 1 is a perspective view of the preferred embodiment of the dewatering apparatus of our invention.

Referring now to the drawings, the dewatering apparatus includes a submersible elongate substantially cylindrical container 10, and an elongate tie means 12.

Figure 3:
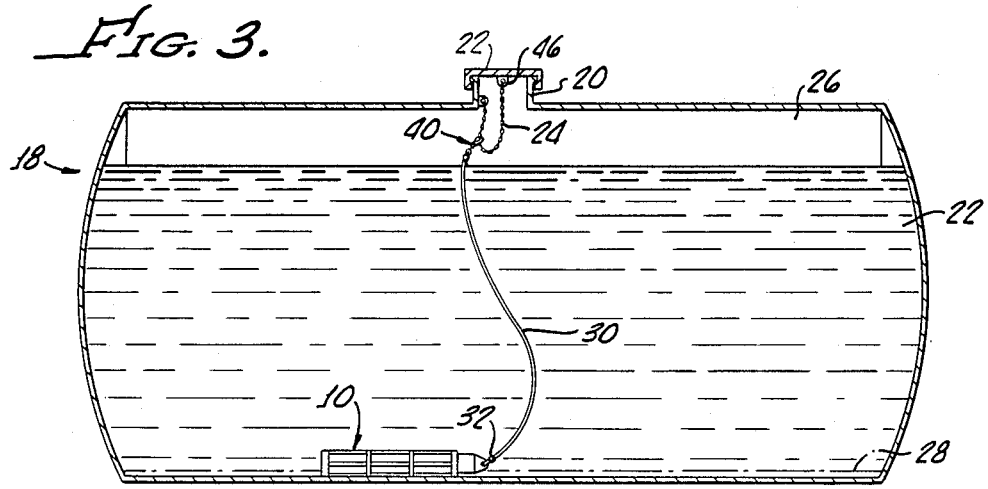
FIG. 3 is a cut-away view of an engine fuel tank with the dewatering apparatus installed in it.

As seen in FIG. 3 a typical engine fuel tank, for example a diesel fuel tank 18 for a heavy truck has a narrow inlet as defined by a short filler neck or tube 20 for use in filling the tank with liquid diesel fuel 22. The inlet 20 has a removable cap 22, the underside of which is interiorly connected to the inlet interior by means of a short chain 24, so that the cap does not get lost or forgotten. Within the partially filled tank 18, a volume 26 disposed above the diesel fuel 22 is filled with air and fumes from the fuel. If the fuel is contaminated with water, since water has a higher specific gravity than diesel fuel, it will most likely tend to be present in a volume 28 adjacent the bottom of the tank 18.

Referring to FIG. 1, the tie means 12 includes a Nylon lanyard 30 having a distal end portion 32 which is tied to the container 10 through an aperture 34 and has a proximal end portion 36 which is tied to the swivel eyelet 38 of a conventional metallic swivel clasp 40. The conventional swivel clasp has a curved steel wire 42 which, in conjunction with a base closure 44, permits the wire loop 42 to open and to securely close so as to releasably and securely attach the clip to various items, typically an eyelet.

As seen in FIG. 3 the proximal end portion 36 of the lanyard 30 is releasably anchored at an accessible location near the inlet 20 by means of attaching the swivel clasp 40 to the chain 24 which is in turn conventionally attached to the underside of the cap 22. In the absence of such chain arrangement, a conventional eyelet (indicated at 46) can be secured to the underneath side of the cap 22, so that the swivel clasp 40 may be releasably attached directly to the cap 22 itself.

The container 10 is sufficiently heavy to sink in the diesel fuel to the bottom of the tank 18 where the presence of water is most likely, and the lanyard is of sufficient length to accommodate this position for the container 10.

Figure 2:
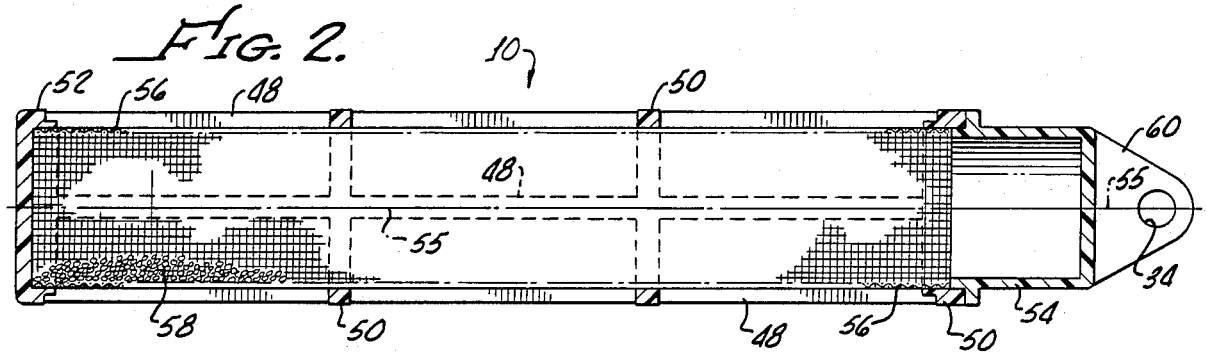
FIG. 2 is a cross-section taken on line 2—2 of FIG. 1.

Referring now to FIGS. 1 and 2, the submersible container 10 comprises a substantially rigid structural nylon cage made up of a plurality of longitudinal ribs 48 circumferentially spaced at 90° intervals about the container and inner-connected with a plurality of longitudinally spaced circumferential ribs 50, a bottom end closure 52 and a top end closure 54. The nylon cage as defined by the widely spaced ribs 48, 50 and end closures 52, 54, generally encompasses an elongate cylindrical volume having a longitudinal axis 55. A cylindrical nylon mesh screen 56 is contained and secured within the cage defined by the ribs and end closures. The screen provides porous wall portions for the container, exposed along the length and around the girth of the container so as to enhance the absorption of water.

The cage and screen preferably are molded from "Nylon 6" molding compound. The screen 56 is put in place in the molding tool for the ribs 48, 50 and bottom end closure 52, at which time the ribs 48, 50 and bottom end closure are integrally molded onto and fused with the screen. The top end closure 54 is molded separately for subsequent assembly.

Prior to installing the top end closure 54 of the container, a preselected volume of dry hygroscopic material 58 is deposited inside the container, after which the top end closure 54 is secured to the cage by ultrasonic welding, thus permanently encasing the hygroscopic material within the container.

The top end closure has an integral guide and attachment means 60 aligned with the container axis 55 and extending outwardly from the end closure 54 while tapering inwardly. The aperture 34 is formed in the guide and attachment means 60 near the apex of its taper and serves as the attachment for the lanyard 30. The location of the aperture 34 and the taper of the guide and attachment means 60 assist in guiding the container upon retrieval through the inlet 20 of the fuel tank.

Each exposed wall portion of the screen 56 is substantial in extent and is readily permeable to air, water and liquid fuel such as diesel fuel or gasoline but is substantially impermeable to the hygroscopic material 58. We have found that a 390 micron mesh screen is suitable for use with the "ALCOSORB AB3C" hygroscopic material, composed principally of cross-linked polyacrylamide co-polymer in the form of a fine granular powder having a dry particle size substantially in excess of 390 microns.

We have been successful in placing 1 cc of this material in the container 10 which has an internal volume capacity of about 70 cc's. However, we must caution that simple testing should be done to determine the volume expansion of the particular batch of hygroscopic material used in order to properly select the volume of dry material to be placed inside any particular container. Placing insufficient material in the container is wasteful of the container's capacity for removing water from the liquid fuel. On the other hand, the hygroscopic material in the presence of water may expand to many times its dry volume, perhaps 70 times or more, in the process of which the material particles swell and become like a gel. Hence, if an excessive amount of dry material is placed inside a container, the hydrated volume of the material may exceed the fixed capacity of the container thus rupturing the container or extruding the hydrated material through the screen, and contaminating the fuel with the hydrated material. If an expandable container were employed, which we do not recommend, excessive expansion of the hygroscopic material could expand the container to a size which might interfere with its subsequent removal through the narrow fuel tank inlet. In any event, it is important to predetermine the maximum hydrated volume which will result from the amount of dry material placed in the container.

As best seen in FIGS. 2 and 3, the volume of dry hygroscopic material 58 fills only a minor portion of the interior volume of the container 10. This dry volume is selected so that upon hydration, the increased volume will substantially fill the capacity of the container, without exceeding that capacity. The container 10 which we employ is an elongate cylinder having a length of about 5 to 6 inches and an external diameter slightly in excess of one inch. This shape and the copious porous wall portions exposed around the girth and along the length of the container assist in exposing it to the likely water zone 28 adjacent the bottom of the fuel tank 18, and enhance its insertion and removal through the narrow fuel tank inlet 20.

From time to time the container may be retrieved and examined in order to detect the presence of water in the liquid fuel. Any significant expansion of the hygroscopic material can be visually detected through the screen 56, as of course can full expansion. In the case of full expansion, the container should be discarded and a fresh container substituted therefore to remove more water from the fuel. The nylon material employed for the lanyard, the container and the hygroscopic material is chemically non-reactive with liquid fuels such as diesel fuel and gasoline under normal conditions. Also the hygroscopic material used does not absorb liquid fuel such as diesel fuel and gasoline.

Inasmuch as many modifications of the present invention may become readily apparent to those skilled in the art in light of the foregoing disclosure, the scope of the present invention should be interpreted solely from the following claims:

What is claimed is:

1. For use in conjunction with an engine fuel tank having a bottom and having an inlet therein for filling the tank with liquid fuel, the combination which comprises:
   (a) a substantially hollow and cylindrical submersible container adapted for insertion into and removal from the fuel tank through said inlet;
   (b) said container comprising an elongate, substantially rigid structural cage, which encompasses an elongate cylindrical volume, and a correspondingly cylindrical screen immediately encompassed by, contained within and secured to the cage;
   (c) the cage having a plurality of circumferentially spaced longitudinal ribs, a plurality of longitudinally spaced circumferential ribs, and opposite end closures, said ribs and end closures being joined together;
   (d) said cylindrical screen being secured within the confines of said spaced longitudinal and spaced circumferential ribs and providing porous wall portions of substantial extent exposed therebetween along the length and around the girth of the container and, in conjunction with the cage, defining a substantially open and fixed, approximately cylindrical internal volume;
   (e) elongate tie means for manually retrieving the container from the bottom of the fuel tank through said inlet, the tie means having proximate and distal end portions;
   (f) means for attaching the distal end portion of the tie means to the structural cage of the container;
   (g) means for releasably anchoring the proximate end portion of the tie means at an accessible location near said fuel tank inlet;
   (h) a dry volume of particulate hygroscopic material disposed inside the container and filling a minor portion of said fixed internal volume of said container, said hygroscopic material being expandable to many times said dry volume in the presence of water;
   (i) said exposed porous wall portions of the screen being permeable to air, water and to the liquid fuel, but substantially impermeable to the hygroscopic material; and,
   (j) the dry volume of said hygroscopic material in said container being selected to limit its fully expanded volume in the presence of water to a predetermined hydrated volume which substantially fills said fixed internal volume of the container without rupturing the container, or extruding the material through the porous wall portions of the container, whereby said container with the hygroscopic material therein may be inserted into and later retrieved from the fuel tank to remove water from the liquid fuel therein.

2. The apparatus of claim 1, wherein said elongate cylindrical container has a central axis, and wherein one of the end closures has a guide and attachment means formed thereon for attachment to the distal end portion of the tie means and for assisting in guiding the container out the fuel tank inlet when the container is retrieved from the fuel tank, said guide and attachment means being aligned with said axis and extending outwardly from said end closure while tapering toward said axis.

3. The apparatus of claim 1, wherein said cylindrical screen is securely joined with said longitudinal and circumferential ribs of the cage encompassing the screen.

4. The apparatus of claim 3, wherein the cage and cylindrical screen are composed of nylon, and wherein the tie means includes an elongate nylon lanyard capable of reaching from the fuel tank inlet to the bottom of the fuel tank.

5. The apparatus of claim 1, wherein the cylindrical screen is approximately 390 micron mesh, and wherein the dry particulate hygroscopic material is principally a cross-linked polyacrylamide co-polymer composed of particle sizes substantially in excess of 390 microns.

6. For use in conjunction with a fuel tank having a bottom and an inlet therein for filling the tank with liquid engine fuel, the combination which comprises:
   (a) a substantially hollow, elongate and cylindrical submersible container adapted for insertion into and retrieval from the bottom of the fuel tank through said inlet;
   (b) said container comprising a substantially cylindrical and rigid structural cage having opposite end closures, and a correspondingly approximately cylindrical screen immediately encompassed by, and contained within the cage;
   (c) said cylindrical screen having porous wall portions and in conjunction with the cage encompassing a substantially open and fixed, approximately cylindrical internal volume;
   (d) a dry volume of particulate hygroscopic material disposed inside the container and filling a minor portion of said fixed internal volume of said container, said hygroscopic material being expandable to many times said dry volume in the presence of water;
   (e) means for attaching an elongate tether to the structural cage for retrieval of the container;
   (f) said porous wall portions of the screen being permeable to air, water and to the liquid fuel, but substantially impermeable to the hygroscopic material; and,
   (g) the dry volume of said hygroscopic material in said container being selected to limit its fully expanded volume in the presence of water to a predetermined hydrated volume which substantially fills said fixed internal volume.

* * * * *